(12) United States Patent
Tatsubori et al.

(10) Patent No.: US 8,443,352 B2
(45) Date of Patent: May 14, 2013

(54) PROCESSING STRINGS BASED ON WHETHER THE STRINGS ARE SHORT STRINGS OR LONG STRINGS

(75) Inventors: Michiaki Tatsubori, Yokohama (JP); Akihiko Tozawa, Tokyo (JP); Toyotaro Suzumura, Tokyo (JP); Tamiya Onodera, Tokyo (JP); Scott Ross Trent, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 12/060,058

(22) Filed: Mar. 31, 2008

(65) Prior Publication Data

US 2009/0249292 A1  Oct. 1, 2009

(51) Int. Cl.
*G06F 9/45* (2006.01)

(52) U.S. Cl.
USPC ........... 717/151; 717/140; 717/143; 717/136; 717/152; 717/114

(58) Field of Classification Search .......... 717/136–147, 717/151–153
See application file for complete search history.

(56) References Cited

U.S. PATENT DOCUMENTS

| 6,308,224 | B1 * | 10/2001 | Leymann et al. | 719/310 |
|---|---|---|---|---|
| 7,376,936 | B2 * | 5/2008 | Bulusu | 717/114 |
| 7,555,757 | B2 * | 6/2009 | Smith et al. | 719/328 |
| 2003/0018956 | A1 * | 1/2003 | Schwarcz | 717/115 |
| 2004/0044678 | A1 * | 3/2004 | Kalia et al. | 707/102 |
| 2004/0103405 | A1 * | 5/2004 | Vargas | 717/137 |
| 2004/0199572 | A1 * | 10/2004 | Hunt et al. | 709/201 |
| 2006/0101429 | A1 * | 5/2006 | Osborne et al. | 717/137 |
| 2007/0101091 | A1 * | 5/2007 | Kaakani et al. | 711/170 |
| 2007/0157123 | A1 * | 7/2007 | Ikawa et al. | 715/816 |
| 2008/0222616 | A1 * | 9/2008 | Cheng et al. | 717/137 |
| 2008/0243770 | A1 * | 10/2008 | Aasman | 707/2 |
| 2008/0243908 | A1 * | 10/2008 | Aasman et al. | 707/102 |

OTHER PUBLICATIONS

Microsoft Visual Studio Developer Center Forum—String Allocate in Stack or Heap Jun. 16, 2006.*

* cited by examiner

*Primary Examiner* — Lewis A Bullock, Jr.
*Assistant Examiner* — Tina Huynh
(74) *Attorney, Agent, or Firm* — Vazken Alexanian

(57) ABSTRACT

The specification of a string within source code written in a programming language is received. The source code is processed for ultimate execution of a computer program encompassing the source code, by at least performing the following. It is determined whether the string specified is a short string or a long string. The string is processed in accordance with a first manner where the string is a short string. The string is processed in accordance with a second manner where the string is a long string.

12 Claims, 3 Drawing Sheets

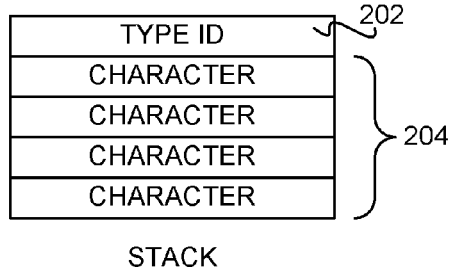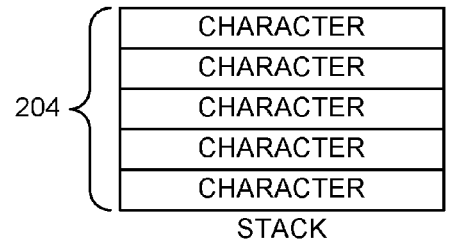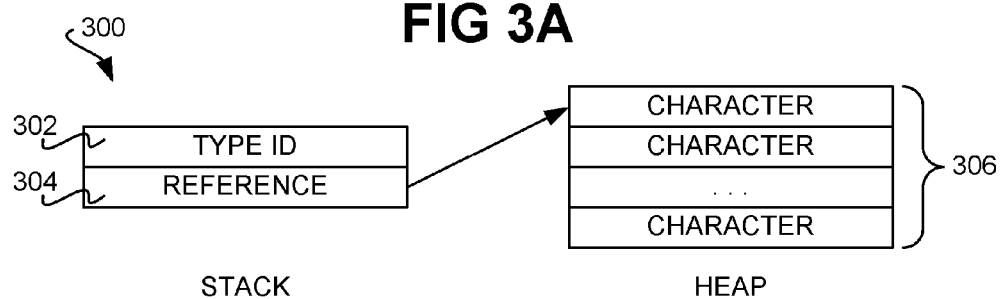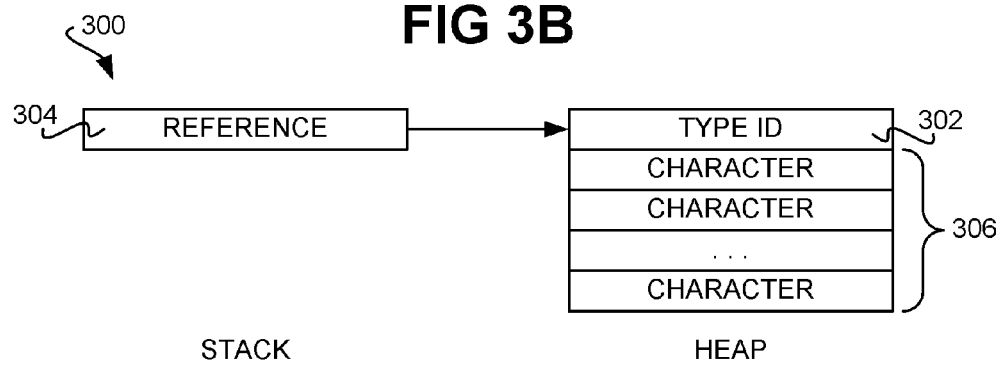

PROCESSING STRINGS BASED ON WHETHER THE STRINGS ARE SHORT STRINGS OR LONG STRINGS

FIELD OF THE INVENTION

The present invention relates generally to processing strings, and more specifically to processing strings depending on whether they are short strings or long strings.

BACKGROUND OF THE INVENTION

Generally, in programming language processing systems and computer program executing systems, such as compilers and interpreters, a character string in source code written in a given programming language is represented as an array. The array has elements with primitive values of the character type, or the type that is equivalent to the character type. The character string is passed by reference using a pointer that points to the array in question.

For example, in the programming language C or C++, a character string is represented as an array of elements of the "char" type. The last element of the array may contain the null character "\0". Similarly, in the Pascal programming language, a character string is represented as an array of elements of the "char" type as well. The first element of the array may contain the length of the character string. In addition, in programming language processing systems operating within a virtual machine, even when a character string is defined as a basic type, the character string is nevertheless represented in a similar format.

Although such representations provide for processing of character strings of variable lengths, such processing typically requires a new character string to be allocated within a memory space as reserved within a heap. (The heap is a common pool of memory that is available to a computer program.) This is because in most cases, the required memory space cannot be allocated within a stack because the character string has a variable length. (The stack may be considered to be a reserved amount of memory used for arithmetic calculations, local variables or to keep track of internal operations of a computer program.) This is problematic, because processing operations involving the heap are generally more computationally intensive than processing operations involving the stack, which means that string processing performance suffers.

By comparison, in relational databases for instance, a fixed-length character string type may be employed. That is, the length of a field record is fixed to realize high-speed data management. While specifying fixed-length character string types may be able to be employed in programming languages as well to avoid string processing performance degradation, numerous disadvantages result. First, the amount of space allocated to each string is the same, even if the string has a length that is smaller than the maximum allowed length. As such, memory is not utilized efficiently. Second, strings greater than the maximum allowed length cannot be specified and/or processed, which can be an undue constraint on writing source code in such a manner.

For these and other reasons, therefore, there is a need for the present invention.

SUMMARY OF THE INVENTION

The present invention relates to processing strings based on whether they are short or long strings. A method of one embodiment of the invention receives a specification of a string within source code written in a programming language. The source code is processed for ultimate execution of a computer program encompassing the source code. This processing includes the following. It is determined whether the string is a short string or a long string. The string is processed in accordance with a first manner where it is a short string, and is processed in accordance with a second manner where it is a long string.

An article of manufacture of an embodiment of the invention includes a tangible computer-readable medium, and means in the medium. The tangible computer-readable medium may be a recordable data storage medium, or another type of tangible computer-readable medium. The means is for processing source code for ultimate execution of a computer program encompassing the source code. This processing includes the following. It is determined whether the string is a short string or a long string. The string is processed in accordance with a first manner where it is a short string, and is processed in accordance with a second manner where it is a long string.

A system of an embodiment of the invention includes hardware and a component implemented at least in the hardware; for instance, the component may also be implemented in software. The component is to process source code for ultimate execution of a computer program encompassing the source code. This processing includes the following. It is determined whether the string is a short string or a long string. The string is processed in accordance with a first manner where it is a short string, and is processed in accordance with a second manner where it is a long string.

Embodiments of the invention provide for advantages over the prior art. Short strings are processed differently than long strings. In particular, upon execution of a computer program, processing a short string results in a memory heap of a computer system on which the computer program is being executed not being employed. Rather, short string processing may be performed completely using the stack, without having to resort to the heap. As a result, short string processing is performed more quickly than long strings are.

By comparison, long strings may be processed as is performed conventionally. This means that artificial constraints on string length are not provided by embodiments of the invention, in contradistinction to relational database-oriented prior art, for instance. As such, a programmer benefits from "the best of both worlds": short strings are processed quickly, while long strings are not limited in their length (i.e., they are variable in length). Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 2A and 2B are diagrams depicting how a short string type can be defined, according to different embodiments of the invention.

FIGS. 3A and 3B are diagrams depicting how a long string type can be defined, according to different embodiments of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
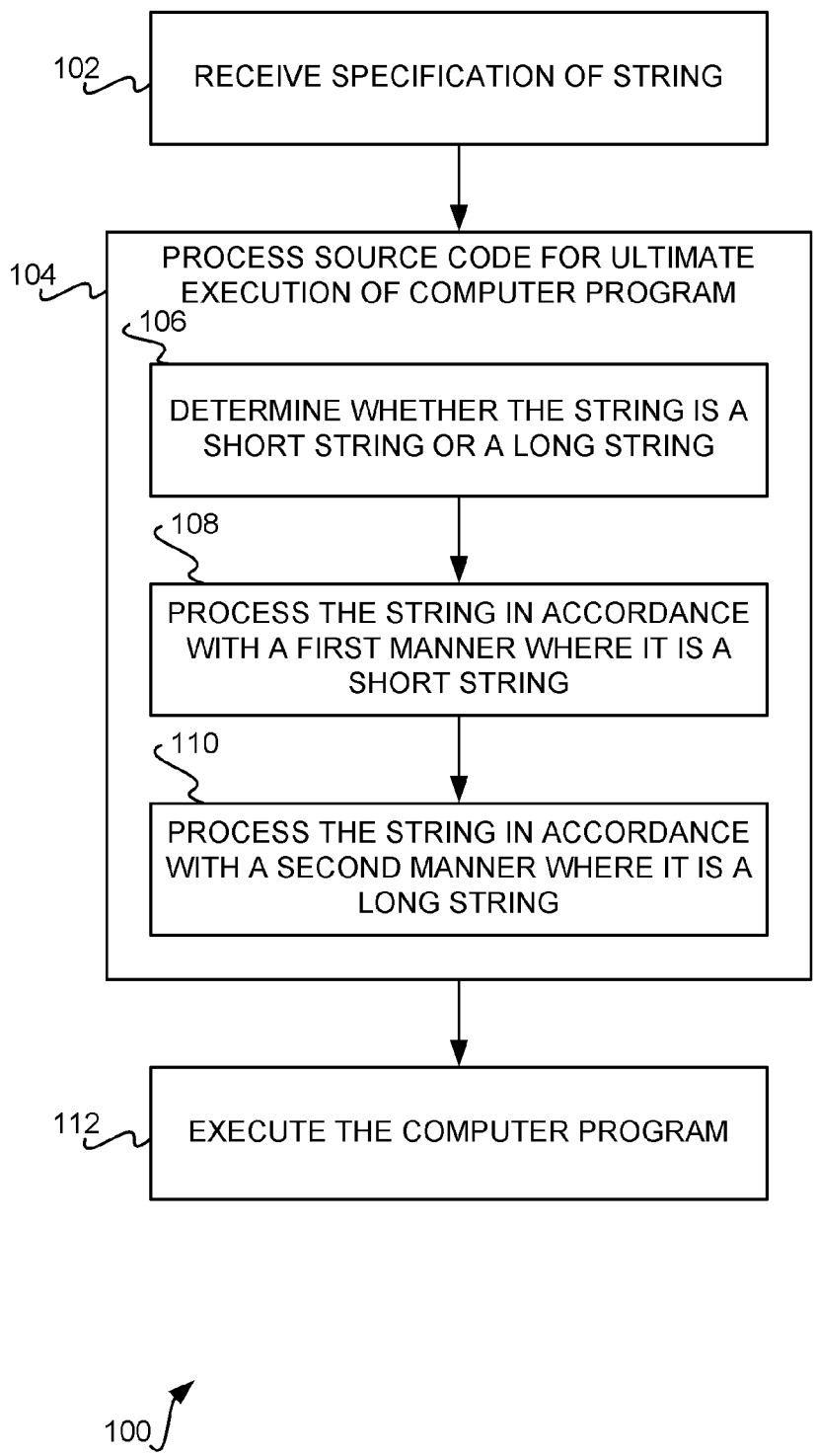
FIG. 1 is a flowchart of a method, according to an embodiment of the invention.

FIG. 1 shows a method 100, according to an embodiment of the invention. The method 100 may be implemented as one or more computer programs stored on a tangible computer-readable medium, and executed by one or more processors of a computer system. The method 100 receives the specification of a string within source code written in a programming language (102). That is, a programmer writes source code for a computer program, such that it can be said that the source code encompasses this computer program. The source code specifies a string.

The source code is processed for ultimate execution of the computer program (104). Such processing can include compiling, in which the source code is compiled to ultimately generate an executable file that when executed causes the computer program to be installed and/or run. Such processing can also include interpretation, in which the source code is interpreted as the computer program is being run (i.e., "on the fly"), such that no executable file of the computer program is ever generated to run or otherwise execute the computer program.

In one embodiment, the processing of the source code can include translating the source code from the programming language in which it has been written to another programming language different than the programming language in which the source code has been written. For instance, the source code may be written in PHP, Perl, Java, or another type of programming language. By comparison, the programming language into which the source code is translated during processing may be C, C++, or another type of programming language.

Processing of the source code in part 104 includes the following. First, it is determined whether the string specified is a short string or a long string (106). The definition of a short string and the definition of a long string are relatively provided in relation to one another. That is, a short string is a string that is defined as being shorter than a long string. Likewise, a long string is a string that is defined as being longer than a short string. Embodiments of the invention may encompass other definitions of short strings and long strings, in addition to and/or in lieu of that provided herein, as can be appreciated by those of ordinary skill within the art.

If the string in question is a short string, then it is processed in accordance with a first manner (108). For instance, such processing can involve not using the memory heap of a computer system on which the computer program is being executed. This is advantageous for performance reasons. String processing involving the heap, for instance, is typically slower than string processing that does not involve the heap. By comparison, if the string in question is a long string, then it is processed in accordance with a second manner that is different than the first manner (110). For instance, such long string processing may be accomplished as is conventional for all strings within the prior art. Ultimately, the computer program is executed (112), resulting in a concrete, tangible, and useful result in performing the method 100 of FIG. 1.

In general, then, the processing performed in the method 100 of FIG. 1 differentiates between a short character string and a long character string. By comparison, existing prior art processing of strings is such that a character string has a single type identifier. In embodiments of the invention, in contradistinction to the prior art, two string type identifiers are provided: one for short character strings, and one for normal character strings.

As is described in more detail later in the detailed description, to represent a short character string and its constituent data, a fixed-length data structure that may include type information can be provided. The fixed-length data structure contains reference type data or a character array of a short character string in addition to the type information. By comparison, to represent a long character string and its constituent data, a conventional data structure may be employed, as can be appreciated by those of ordinary skill within the art.

Thus, the processing performed in the method 100 of FIG. 1 processes character strings differently based on the type of character string in question. That is, short character strings are processed differently than long character strings. By comparison, within the prior art, string processed is performed the same regardless of the length of a character string. That is, there is no differentiation within the prior art between short character strings and long character strings during string processing.

FIGS. 2A and 2B show two different ways in which a short string type can be defined, according to different embodiments of the invention. In FIG. 2A, the short string type 200 can include four characters 204; there is also a type identifier 202 that identifies the short string type 200. Those of ordinary skill within the art can appreciate that there may be less or more than four characters 204, although there are at least two characters 204.

By comparison, in FIG. 2B, the short string type 200 can include five characters 204, and there is no type identifier that identifies the short string type 200, in contradistinction to the short string type 200 in FIG. 2A. Those of ordinary skill within the art can appreciate that there may be less or more than five characters 204, although there are at least two characters 204. It is noted that in both FIGS. 2A and 2B, the entire data structure in question resides on the stack. As such, the data structure for the short string type 200 can be processed entirely on the stack, without resorting to the heap.

The short string type 200 of FIG. 2A may be represented in the programming language C as follows:

```
struct ShortString {
    char type;
    char[4] shortString;
}
```

By comparison, the short string type 200 of FIG. 2B may be represented in the programming language C as follows:

```
struct ShortString {
    char[5] shortString;
}
```

In both cases, the short string type 200 has a fixed length.

FIGS. 3A and 3B show two different ways in which a long string type can be defined, according to different embodiments of the invention. Those of ordinary skill within the art will recognize that the long string type 300 of FIGS. 3A and 3B is at least substantially the same as how strings are generally defined conventionally. In FIG. 3A, the long string type 300 includes a type identifier 302 that identifies the long string type 300, as well as a reference 304, or pointer, on the stack. The reference 304 points to a variable-length number of characters 306 residing on the heap.

By comparison, in FIG. 3B, the long string type 300 includes just the reference 304, or pointer, on the stack. The reference 304 points to the type identifier 302 on the heap, where the type identifier 302 is followed on the heap by the variable-length number of characters 306. The characters of the long string data structure in question reside on the heap in both FIGS. 3A and 3B. As such, the data structure for the long string type 300 is processed more slowly, because the heap has to be accessed.

The long string type 300 of FIG. 3A may be represented in the programming language C as follows:

```
struct String {
    char type;
    char* stringPtr;
}
```

By comparison, the long string type 300 of FIG. 3B may be represented in the programming language C as follows:

```
struct String {
    char* stringPtr;
}
```

In both cases, the long string type 300 has a variable length, since the characters of the long string reside on the heap.

Next, the processing of the specification of a string within source code, in part 104 of the method 100 of FIG. 1, where a short string is defined as in FIG. 2A, is described. The definition of a string—either a long string or a short string—in this processing may be considered a dynamic data type. This is because a string may be dynamically specified as either having a short data type or a long data type. That is, the specification of the string within the source code itself includes a type identifier identifying whether the string is a short string or a long string. Thus, determining whether the string specified is a short string or a long string in part 106 of the method 100 in this situation include examining the type identifier of the string in question.

The processing in this dynamic data type embodiment is particularly described in reference to the following source code segment in PHP: echo $x. This segment display characters stored in a variable $x on a screen, or within a page of a web browser. In a system that implements the method 100 of FIG. 1 using C—such that the PHP source code is translated to C—a variable var1 may store a pointer indicating internal representation data of the value stored in $x. The variable var1 is declared as a pointer type indicating that data is declared as the following structure:

```
struct AbstractValue {
    char type;
    char [7]
}
```

The member "type" of this structure can be accessed for both data of a short character string type as well as data of a normal, long character string type, in addition to other types of values like integers. A normal character string is processed as a structure of a "struct String" type, as is conventional. By comparison, a short character string is processed as a structure of a "struct ShortString" type. The type identifiers of these types can be represented by the constants "STRING" and "SHORT_STRING".

The processing can thus be performed by employing a switch operator to examine the type identifier of the specification of the string within the source code. As such, case operators are used to process the string in accordance with the first or the scanner manner in parts 108 and 110 of the method 100, depending on whether the type identifier is "STRING" or "SHORT_STRING". For example, in C, the PHP source code segment noted above may be processed as follows:

```
switch (x->type) {
case SHORT_STRING:
    printf("%s", ((struct ShortString*) var1)->shortString);
    break;
case STRING:
    printf("%s", ((struct String*) var1)->stringPtr);
    break;
case . . .
}
```

In this example, short strings defined as in FIG. 2A are processed without employing the heap, whereas long strings defined as in FIG. 3B (or alternatively as in FIG. 3A) are processed by employing the heap. Thus, a programmer writing PHP source code can handle variable $x without caring whether it actually is of strings of short string or strings of long string type. The short string types are fixed in length, while the long string types are variable in length. Advantageously, the short string type can be employed wherever possible to increase processing performance.

Next, the processing of the specification of a string within source code, in part 104 of the method 100 of FIG. 1, where a short string is defined as in FIG. 2B, is described. The definition of a string—either a long string or a short string—in this process may be considered an estimated static size type. This is because there is no type identifier per se for short strings in particular in FIG. 2B; instead, strings that are defined in a certain way—as described later in the detailed description—are automatically considered to be short strings. It is noted that such short strings may in fact be variable in length in at least some embodiments, because each short string can be defined separately as compared to other short strings.

In one embodiment, an array of characters that include each of a number of predetermined characters is concluded in part 106 of the method 100 of FIG. 1 to be a short string, whereas any array of characters that does not include all these predetermined characters is concluded in part 106 to be a long string. As such, an estimation is performed in part 106 of the method 100 to determine whether a given string is a short string or a long string. That is, when a given string is first defined, it is determined whether the string should be internally represented as a short string or a long string.

Unlike the previous, dynamic data type embodiment, where a programmer writing the source code has to particularly call out whether each string is a short string or a long string—by indicating a type identifier associated with the string in question—in this embodiment, the programmer does not have to particularly call out whether each string is a short string or a long string. Rather, the programmer may merely have to define what the predetermined characters are, such that if a subsequently defined string includes all these predetermined characters, then internal representation of the string will automatically be as a short string.

For example, a programmer may be writing source code for a computer program in the Java programming language. The programmer may include the following definition of the predetermined characters that dictate whether a given string is defined as a short string type where the given string includes all these predetermined characters: String[ ] x={"<", ">", "<\", ">", "\>"}; Those of ordinary skill within the art can recognize that these predetermined characters are those commonly associated with tags in markup formats like HTML and XML.

The processing that is performed in parts 108 and 110 can in this embodiment include the replacement of one or more source code lines written in a particular programming language with one or more other (replacement) source code lines that may be written in the same programming language. That is, the programmer specifies source code lines as conventionally, but an optimizing process is performed in parts 108 and 110—such as part of a compiling process in one embodiment—to optimize these source code lines based on whether they pertain to short strings or long strings. For example, one operation that a programmer may specified in Java is the StringBuffer.append( ) statement which can be used in the following example Java source code segment:

```
StringBuffer s;
s.append(x[i]);
```

In part 106 of the method 100, the string s is determined to be a short string or a long string, based on whether it includes all the predetermined characters noted above. If the string s does not, then it is considered a long string, and in part 110, the string s is processed conventionally, such that the Java source code segment noted above is not optimized. By comparison, if the string s does contain all the predetermined characters, then it is considered a short string, and in part 108, the Java source code segment is modified into the C language as follows for optimization purposes:

```
StringBuffer* s;
char* shortString = ((struct ShortString*) & x[i])->shortString;
strcpy(&s->buffer[s->len], shortString);
s->size += strlength(shortString);
```

The advantages of the static size type estimation approach of this embodiment of the invention are numerous. As in the dynamic data type embodiment described above, the heap is not employed for processing short strings, realizing certain performance advantages. However, in contradistinction to the dynamic data type embodiment described above, short strings may be of variable size, and memory space savings are realized due to a particular type identifier not having to be included for each string. The latter advantage is also beneficial because the programmer does not have to consciously think about what type of a string each string should be; rather, he or she defines a short string type implicitly by defining the predetermined characters once, and thereafter any string that upon initial definition includes all these characters is automatically defined as a short string. Furthermore, there is no need for a "switch" statement, the result of which can also mean faster processing.

Figure 4:
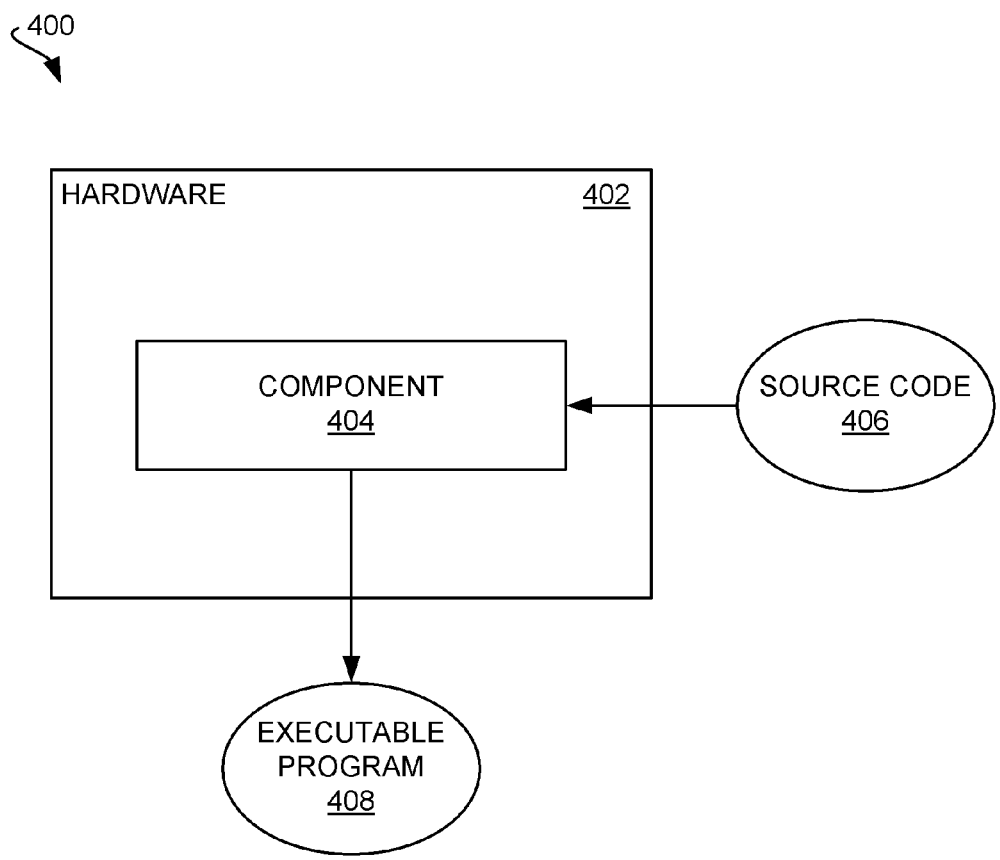
FIG. 4 is a diagram of a rudimentary system, according to an embodiment of the invention.

In conclusion, FIG. 4 shows a rudimentary system 400, according to an embodiment of the invention. The system 400 includes hardware 402. Such hardware 402 includes memory, processor(s), storage devices, and/or other types of computer hardware, as can be appreciated by those of ordinary skill within the art. The component 404 is implemented at least in the hardware 402. For instance, the component 404 may be software that runs on the hardware 402.

The component 404 processes source code 406 at least by performing the method 100 of FIG. 1 that has been described. As such, the source code 406 ultimately realizes an executable computer program 408. In one embodiment, the component 404 may be a compiler that compiles the source code 406 to generate an executable file that provides for execution of the program 408. In another embodiment, the component 404 may be an interpreter that interprets the source code 406 to execute the program 408 on the fly. In either such embodiment, the source code 406 may be optimized to provide for faster processing of short strings, as has been described herein.

Finally, it is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:
1. A method comprising:
receiving specification of a string within source code written in a programming language; and,
processing the source code for ultimate execution of a computer program encompassing the source code, by at least:
determining whether the string specified is a short string or a long string;
processing the string in accordance with a first manner where the string is a short string, the first manner being such that upon the ultimate execution of the computer program, a memory heap of a computer system on which the computer program is executed is not employed, but rather a stack of the computer system is employed, to handle the short string during execution of the computer program; and,
processing the string in accordance with a second manner where the string is a long string, the second manner being such that upon the ultimate execution of the computer program, the memory heap of the computer system on which the computer program is executed is employed to handle the long string during execution of the computer program,
wherein the specification of the string does not include a type identifier indicating whether the string is a short strong or a long string, wherein determining whether the string specified is a short string or a long string comprises determining whether the string within the source code itself originally includes each of a plurality of predetermined characters, such that if the string includes all the predetermined characters then the string is concluded to be a short string, and if the string does not include all the predetermined characters then the string is concluded to be a long string, wherein the string is specified as a short string or a long string regardless of a length of the string, such that a given first string is determined as a short string and a given second string is determined as a long string even though a length of the given first string is greater than a length of the given second string, and wherein determining whether the string specified is a short string or a long string is performed without comparing the length of the string to a predetermined length and without inspecting the length of the string itself.

2. The method of claim 1, further comprising executing the computer program.

3. The method of claim 1, wherein the programming language in which the source code is written is a first programming language, and processing the source code for ultimate execution of the computer program encompassing the source code comprises translating the source code into a second programming language different than the first programming language.

4. The method of claim 3, wherein processing the source code comprises compiling the source code from the first programming language to the second programming language, such that an executable file of the computer program is ultimately generated to execute the computer program.

5. The method of claim 3, wherein processing the source code comprises interpreting the source code from the first programming language to the second programming language as the computer program is being run, such that no executable file of the computer program is ever generated to execute the computer program.

6. The method of claim 1, wherein processing the string in accordance with the first manner comprises replacing a line of the source code encompassing the specification of the string with one or more replacement lines within the source code encompassing the specification of the string particular to the first manner.

7. A non-transitory computer-readable medium storing computer-execute code executable by a processor of a computing device to process source code for ultimate execution of a computer program encompassing the source code, by at least:

determining whether a string specified within the source code is a short strong or a long string;

processing the string in accordance with a first manner where the string is a short string, the first manner being such that upon the ultimate execution of the computer program, a memory heap of a computer system on which the computer program is executed is not employed, but rather a stack of the computer system is employed, to handle the short string during execution of the computer program; and, processing the string in accordance with a second manner where the string is a long string, the second manner being such that upon the ultimate execution of the computer program, the memory heap of the computer system on which the computer program is executed is employed to handle the long string during execution of the computer program, wherein a specification of the string within the source code itself comprises a type identifier indicating whether the string is a short strong or a long string, wherein determining whether the string specified is a short string or a long string comprises examining the type identifier of the specification within the source code itself, wherein where the specification within the source code itself indicates that the string is a short string, the string is determined as a short string regardless of a length of the string, wherein where the specification within the source code itself indicates that the string is a long string, the string is determined as a long string regardless of the length of the string, and wherein determining whether the string specified is a short string or a long string is performed without comparing the length of the string to a predetermined length and without inspecting the length of the string itself.

8. The non-transitory computer-readable medium of claim 7, wherein the source code is written is a first programming language, and processing the source code for ultimate execution of the computer program encompassing the source code comprises translating the source code into a second programming language different than the first programming language.

9. A system comprising:

hardware;

a component implemented at least in the hardware to process source code for ultimate execution of a computer program encompassing the source code, by at least:

determining whether a string specified within the source code is a short strong or a long string;

processing the string in accordance with a first manner where the string is a short string, the first manner being such that upon the ultimate execution of the computer program, a memory heap of a computer system on which the computer program is executed is not employed, but rather a stack of the computer system is employed, to handle the short string; and, processing the string in accordance with a second manner where the string is a long string, the second manner being such that upon the ultimate execution of the computer program, the memory heap of the computer system on which the computer program is executed is employed to handle the long string, wherein the specification of the string does not include a type identifier indicating whether the string is a short strong or a long string, wherein determining whether the string specified is a short string or a long string comprises determining whether the string within the source code itself originally includes each of a plurality of predetermined characters, such that if the string includes all the predetermined characters then the string is concluded to be a short string, and if the string does not include all the predetermined characters then the string is concluded to be a long string, wherein the string is specified as a short string or a long string regardless of a length of the string, such that a given first string is determined as a short string and a given second string is determined as a long string even though a length of the given first string is greater than a length of the given second string, and wherein determining whether the string specified is a short string or a long string is performed without comparing the length of the string to a predetermined length and without inspecting the length of the string itself.

10. The system of claim 9, wherein the source code is written is a first programming language, and processing the source code for ultimate execution of the computer program encompassing the source code comprises translating the source code into a second programming language different than the first programming language.

11. The non-transitory computer-readable medium of claim 7, wherein examining the type identifier of the specification of the string comprises employing a switch operator, wherein processing the string in accordance with the first manner comprises employing a first case operator, and wherein processing the string in accordance with the second manner comprises employing a second case operator.

12. The system of claim 9, wherein processing the string in accordance with the first manner comprises replacing a line of the source code encompassing the specification of the string with one or more replacement lines within the source code encompassing the specification of the string particular to the first manner.

* * * * *